United States Patent
Itoh et al.

(10) Patent No.: US 6,584,796 B2
(45) Date of Patent: Jul. 1, 2003

(54) HEAT PUMP CYCLE HAVING INTERNAL HEAT EXCHANGER

(75) Inventors: Satoshi Itoh, Kariya (JP); Yoshitaka Tomatsu, Chiryu (JP); Motohiro Yamaguchi, Hoi-gun (JP); Yasushi Yamanaka, Nakashima-gun (JP); Toshio Hirata, Haguri-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/981,702

(22) Filed: Oct. 17, 2001

(65) Prior Publication Data

US 2002/0046570 A1 Apr. 25, 2002

(30) Foreign Application Priority Data

Oct. 20, 2000 (JP) .......................... 2000-321190
Sep. 19, 2001 (JP) .......................... 2001-285386

(51) Int. Cl.⁷ .......................... F25B 13/00; F25B 41/00
(52) U.S. Cl. .......................... 62/324.1; 62/159; 62/513
(58) Field of Search .......................... 62/159, 197, 115, 62/324.1, 324.6, 503, 527, 513, 498; 165/154, 155

(56) References Cited

U.S. PATENT DOCUMENTS

| | | | | |
|---|---|---|---|---|
| 3,858,407 A | * | 1/1975 | Schumacher | 62/503 |
| 5,245,836 A | | 9/1993 | Lorentzen et al. | |
| 6,178,761 B1 | * | 1/2001 | Karl | 62/159 |

FOREIGN PATENT DOCUMENTS

JP 2000-130878 5/2000

* cited by examiner

*Primary Examiner*—Chen Wen Jiang
(74) *Attorney, Agent, or Firm*—Harness, Dickey & Pierce, PLC

(57) ABSTRACT

Heat exchange is performed between a discharge side refrigerant and a suction side refrigerant also at the time of a heating operation. By this, a liquid phase refrigerant containing lubricating oil in the suction side refrigerant is heated by the discharge side refrigerant, and the liquid phase refrigerant is vaporized also at the time of the heating operation, so that the amount of the liquid phase refrigerant sucked into a compressor is decreased. Accordingly, the increase of compression work of the compressor is prevented, and an opening area of an oil return hole can be expanded to such a degree that an optimum amount of lubricating oil is attained at the time of the heating operation.

11 Claims, 16 Drawing Sheets

REFRIGERANT

REFRIGERANT

HEAT PUMP CYCLE HAVING INTERNAL HEAT EXCHANGER

CROSS REFERENCE TO RELATED APPLICATION

This application is based on and incorporates herein by reference Japanese Patent Application Nos. 2000-321190 filed on Oct. 20, 2000, and 2001-285386 filed on Sep. 19, 2001.

BACKGROUND OF THE INVENTION

1. Field of the Invention

The present invention relates to a heat pump cycle capable of switching between cooling and heating, which is suitable for use in a supercritical heat pump cycle in which a refrigerant pressure exceeds the critical pressure of a refrigerant.

2. Description of Related Art

JP-A-2000-130878 discloses a heat pump cycle capable of switching between cooling and heating. In the heat pump cycle, an internal heat exchanger is provided for performing heat exchange between a suction side refrigerant to be sucked into a compressor and a discharge side refrigerant discharged from the compressor. A pressure reducing unit is disposed between an internal heat exchanger and an indoor heat exchanger, so that heat exchange is performed between the suction side refrigerant and the discharge side refrigerant at the time of a cooling operation, and heat exchange is not effected between the suction side refrigerant and the discharge side refrigerant at the time of a heating operation.

In a refrigerating cycle, since lubricating oil is mixed into a refrigerant to lubricate a sliding portion in a compressor, an oil return hole is provided in an accumulator for extracting a liquid phase refrigerant containing lubricating oil. The refrigerant extracted through the oil return hole and containing the lubricating oil is supplied to a suction side of the compressor together with a gas phase refrigerant separated in the accumulator.

The amount of heat equivalent to the work of compression of the compressor is used for heating at the time of a heating operation, so that a circulating mass flow rate of the refrigerant required at the time of the heating operation is generally smaller than a circulating mass flow rate required at the time of a cooling operation.

Thus, when the size of the oil return hole is designed so that an optimum amount of lubricating oil is attained at the time of the cooling operation, the amount of lubricating oil needed at the time of the heating operation may not be attained.

On the contrary, when the size of the oil return hole is designed so that an optimum amount of lubricating oil is attained at the time of the heating operation, the amount of liquid phase refrigerant sucked into the compressor is increased, so that the work of compression of the compressor is increased and a Coefficient Of Performance (COP) of the heat pump cycle is worsened.

SUMMARY OF THE INVENTION

An object of the present invention is to prevent of a Coefficient Of Performance (COP) from being worsened while sufficiently attaining a lubricating oil amount needed at the time of a heating operation.

According to the present invention, a compressor sucks and compresses a refrigerant. An outdoor heat exchanger performs a heat exchange between outdoor air and the refrigerant. An indoor heat exchanger performs a heat exchange between indoor air blowing into a vehicle compartment and the refrigerant. An accumulator separates the refrigerant into a gas phase refrigerant and a liquid phase refrigerant containing lubricating oil. The accumulator includes an oil return hole for extracting the liquid phase refrigerant containing lubricating oil, and allows the liquid phase refrigerant containing the lubricating oil extracted from the oil return hole and the separated gas phase refrigerant to flow out to the compressor. An internal heat exchanger performs a heat exchange between a discharge side refrigerant flowing between the indoor heat exchanger and the outdoor heat exchanger and a suction side refrigerant flowing out of the accumulator. A first pressure reducing unit is provided in a refrigerant passage allowing the indoor heat exchanger to communicate with the internal heat exchanger. The first pressure reducing unit decompresses the refrigerant flowing out of the internal heat exchanger at a time of the cooling operation to cool the air blowing into the vehicle compartment. A second pressure reducing unit is provided in a refrigerant passage allowing the outdoor heat exchanger to communicate with the internal heat exchanger. The second pressure reducing unit decompresses the refrigerant flowing out of the internal heat exchanger at a time of the heating operation to heat the air blowing into the vehicle compartment.

By this, also at the time of the heating operation, the liquid phase refrigerant is vaporized by heating the liquid phase refrigerant containing lubricating oil in the suction side refrigerant by the discharge side refrigerant, so that the amount of the liquid phase refrigerant sucked into the compressor is decreased.

Accordingly, the work of compression of the compressor is prevented from increasing, and an opening area of the oil return hole can be expanded to such a degree that an optimum amount of lubricating oil is attained at the time of the heating operation.

Further, since the enthalpy of the discharge side refrigerant is lowered by performing a heat exchange between the discharge side refrigerant and the suction side refrigerant, the amount of heat absorption in the indoor heat exchanger at the time of the cooling operation, and the amount of heat released in the indoor exchanger at the time of the heating operation are increased.

As described above, according to the present invention, the amount of lubricating oil needed at the time of the heating operation is attained, and the COP of the heat pump cycle is prevented from being worsened.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
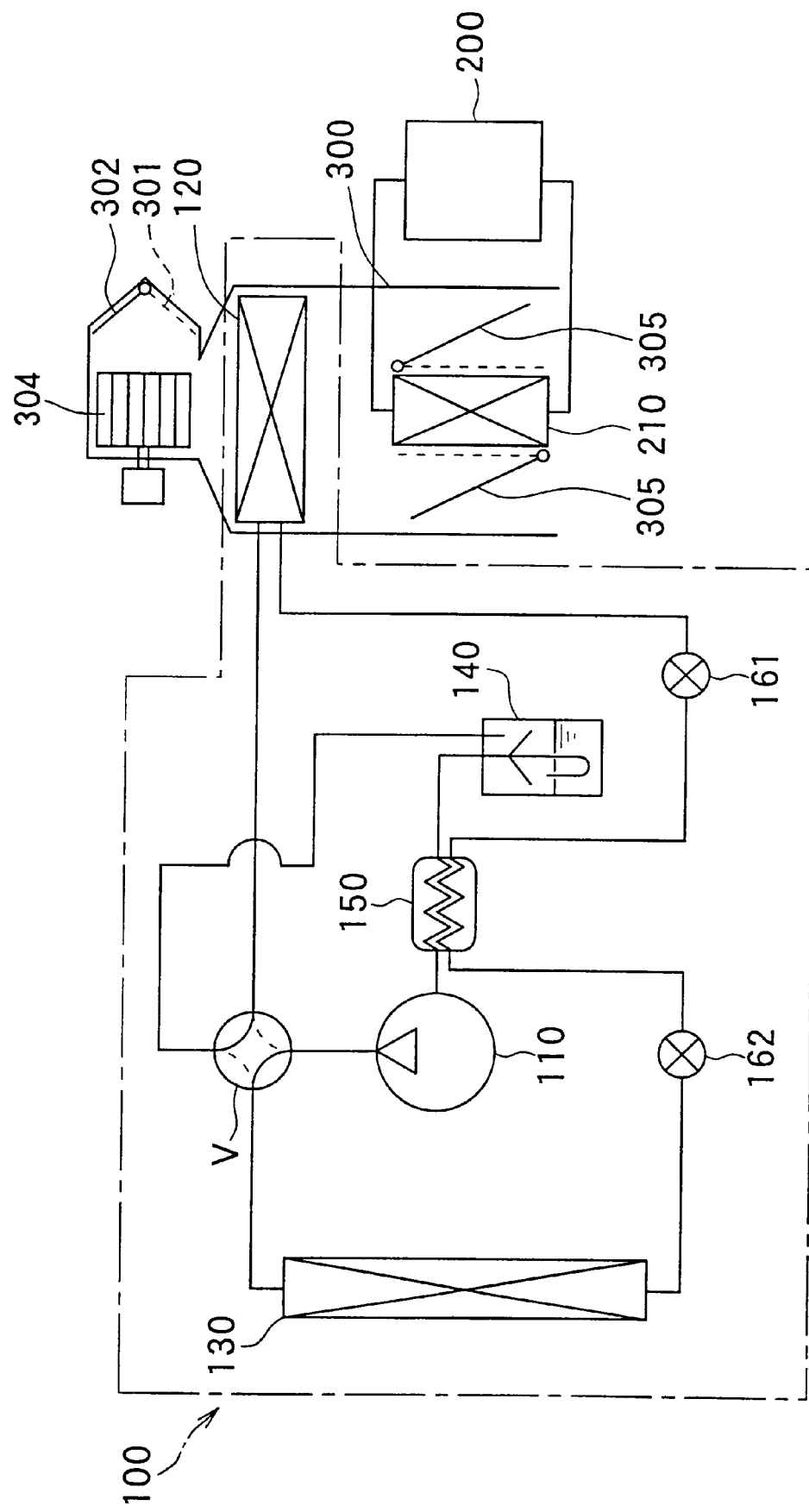
FIG. 1 is a schematic view showing a heat pump cycle (first embodiment)

A heat pump cycle is applied to an air conditioner of an electric vehicle. The heat pump cycle uses carbon dioxide as a refrigerant. FIG. 1 is a schematic view showing the air conditioner for a vehicle.

In FIG. 1, equipment surrounded by one dotted chain line is a heat pump 100. A fuel cell (in the present embodiment, a high molecular electrolyte type fuel cell) 200 generates electricity by a chemical reaction of oxygen and hydrogen and supplies the generated electric power to a vehicle electric motor (not illustrated).

An electric compressor 110 of an inverter control system for sucks and compresses a refrigerant. An indoor heat exchanger 120 heat exchanges between air blowing into a compartment and the refrigerant. An outdoor heat exchanger 130 heat exchanges between outdoor air and the refrigerant.

A switching valve V switches between a case where the refrigerant discharged from the compressor 110 is made to flow to the indoor heat exchanger 120 and a case where it is made to flow to the outdoor heat exchanger 130. An accumulator (gas and liquid separating tank) 140 separates the refrigerant into a gas phase refrigerant and a liquid phase refrigerant to cause the gas phase refrigerant to flow to the suction side of the compressor 110 and for accumulating a surplus refrigerant in the heat pump.

Figure 2:
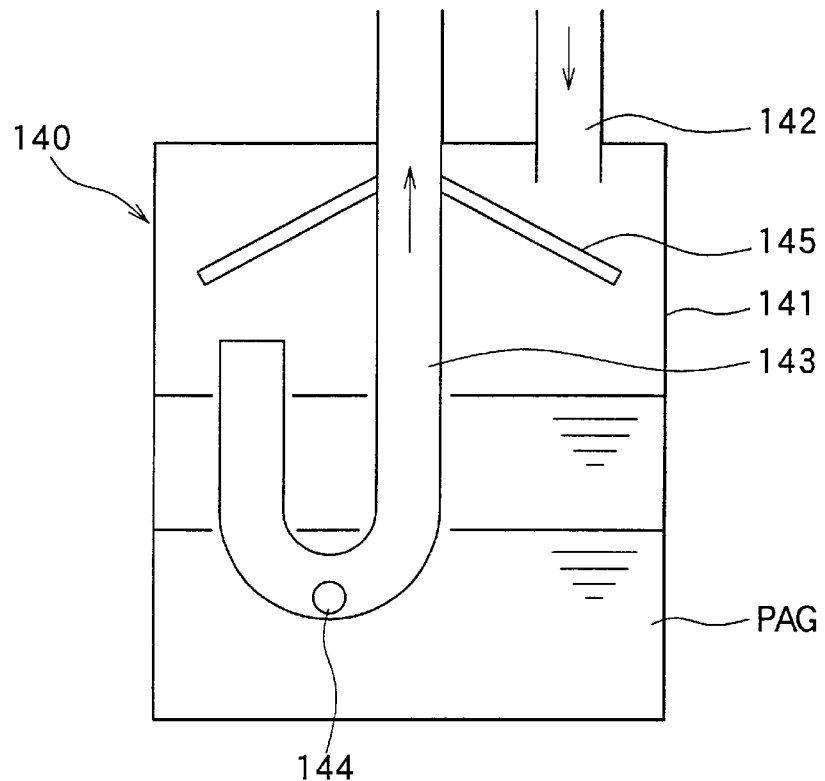
FIG. 2 is a schematic view showing an accumulator (first embodiment)

Here, as shown in FIG. 2, the accumulator 140 includes a refrigerant inlet 142 provided at an upper side of a substantially cylindrical accumulator housing 141, a refrigerant discharge pipe 143 shaped into a substantially J-shaped form to protrude toward a lower side, and a stir preventing plate 145 for preventing the liquid phase refrigerant and the gas phase refrigerant from being mixed by a stir in the accumulator 140 by the jet flow of the refrigerant flowing into the accumulator 140.

One end of the refrigerant discharge pipe 143 is opened above a liquid surface of the liquid phase refrigerant in the accumulator housing 141 and at a lower side of the refrigerant inlet 142, so that the gas phase refrigerant is introduced into the refrigerant discharge pipe 143, and the introduced gas phase refrigerant flows out to the suction side of the compressor 110.

An oil return hole 144 for sucking lubricating oil stored at a lower side of the liquid phase refrigerant is provided at a lower end portion of the refrigerant discharge pipe 143. The lubricating oil separated and stored in the accumulator 140, together with the gas phase refrigerant flowing in the refrigerant discharge pipe 143, is sucked into the compressor 100. Here, the lubricating oil is an oil containing PAG (Polyalkylene Glycol) as its main ingredient.

Here, the lubricating oil and the liquid phase refrigerant are not actually completely separated as shown in FIG. 2. Accordingly, the lubricating oil here does not mean only pure lubricating oil but means the liquid phase refrigerant containing much lubricating oil.

In FIG. 1, an internal heat exchanger 150 heat exchanges between a discharge side refrigerant flowing between the indoor heat exchanger 120 and the outdoor heat exchanger 130, and a suction side refrigerant flowing out of the accumulator 140 and sucked into the compressor 110. The internal heat exchanger 150 is a double cylinder type heat exchanger in which the discharge side refrigerant flows through an inside cylinder and the suction side refrigerant flows through an outside cylinder.

An electric first pressure reducing unit 161 is provided in a refrigerant passage connecting the internal heat exchanger 150 and the indoor exchanger 120. The first pressure reducing unit 161 decompresses the refrigerant flowing out of the outdoor exchanger 130 at the time of a cooling operation to cool air blowing into a vehicle compartment. An electric second pressure reducing unit 162 is provided in a refrigerant passage connecting the outdoor exchanger 130 and the internal heat exchanger 150. The second pressure reducing unit 162 decompresses the refrigerant flowing out of the indoor exchanger 120 at the time of a heating operation to heat air blowing into the vehicle compartment. The opening degrees of these pressure reducing units 161 and 162 are controlled by an electronic control unit.

An air conditioning casing 300 forms a passage for air blowing into the vehicle compartment. An interior air inlet 301 for introducing indoor air and an exterior air inlet 302 for introducing outdoor air are provided at the air upstream side the air conditioning casing 300.

Both the inlets 301 and 302 are switched to be opened and closed by an interior and exterior air switching door 303. A centrifugal blower 304 generates air flowing into the vehicle compartment.

In the air conditioning casing 300, the indoor heat exchanger 120 of the heat pump 100 is disposed at the air downstream side of the blower 304, and a heater core 210 is disposed at the air downstream side of the indoor exchanger 120. The heater core 210 heats the air by cooling water which has recovered waste heat generated in the FC stack 200.

An air mix door 305 adjusts a temperature of the air blowing into the vehicle compartment by adjusting the air volume ratio of warmed air passing through the heater core 210 to cooled air detouring around the heater core 210.

A face outlet (not illustrated) for blowing the air-conditioning air to the upper area of a passenger in the vehicle compartment, a foot outlet (not illustrated) for blowing the air to the feet of the passenger, and a defroster outlet (not illustrated) for blowing air to the inner surface of a front glass (not illustrated) are formed at the air downstream side of the air mix door 305. Blower mode switching doors (not illustrated) for opening and closing the respective outlets are disposed at the air upstream side of these outlets.

Figure 3:
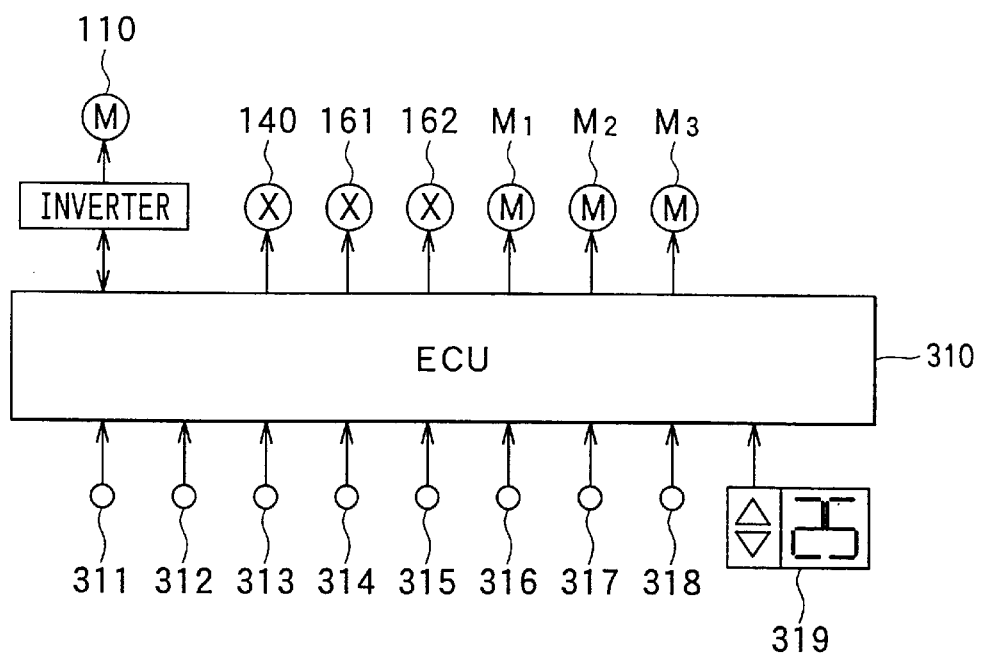
FIG. 3 is a schematic view showing a control system of the heat pump cycle (first embodiment)

The blower mode switching doors, the air mix door 305, and the interior and exterior air switching door 303 are driven by servo motors M1–M3, and these servo motors M1–M3 and an electric motor M4 of the blower 304 are controlled by an electric control unit (ECU) 310 as shown in FIG. 3.

The ECU 310 receives detection values of a first pressure sensor 311 for detecting the pressure of the refrigerant flowing out of the outdoor heat exchanger 130, a first temperature sensor 312 for detecting the temperature of the refrigerant flowing out of the outdoor heat exchanger 130, a second pressure sensor 313 for detecting the pressure of the refrigerant flowing out of the indoor heat exchanger 120, a second temperature sensor 314 for detecting the temperature of the refrigerant flowing out of the indoor heat exchanger 120, an exterior air temperature sensor 315 for detecting the temperature of exterior air, a post-indoor heat exchanger temperature sensor 316 for detecting the temperature of air immediately after passing through the indoor heat exchanger 120, an interior air temperature sensor 317 for detecting the temperature of interior air, and a solar radiation sensor 318 for detecting the amount of solar radiation streaming into the compartment, and a set value inputted into a temperature control panel 319 for setting and receiving indoor temperature desired by the passenger.

The ECU 310 controls the blower mode switching door (M1), the air mix door 305 (M2), the interior and exterior air switching door 303 (M3), the blower 304 (M4), the pressure reducing units 161 and 162, the switching valve V, and the compressor 110 in accordance with a previously set program on the basis of the detected values of the sensors 311–318 and the set temperature Tset of the temperature control panel 319.

Next, an operation of the air conditioner according to the present embodiment will be described.

Figure 4:
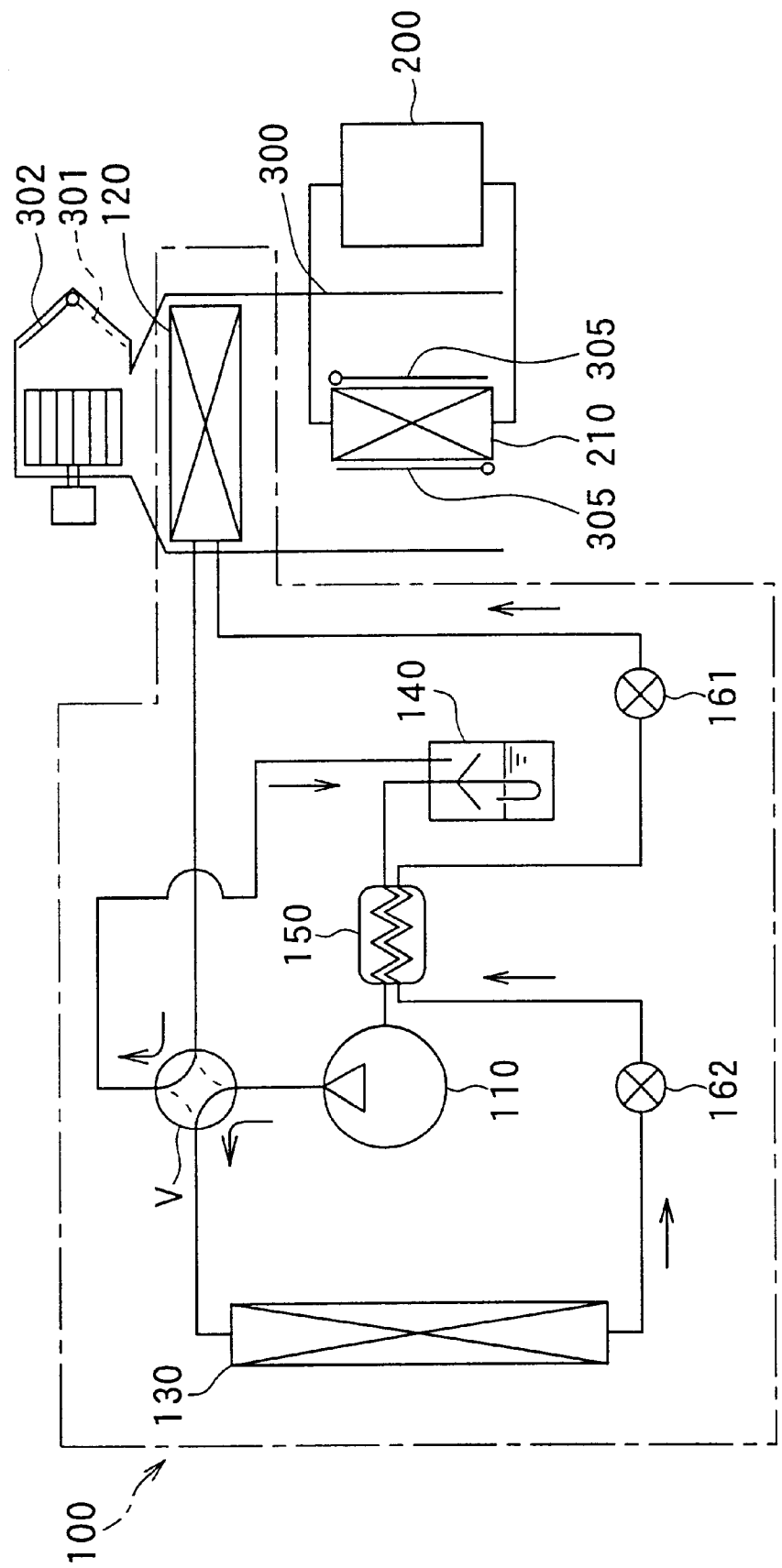
FIG. 4 is a schematic view showing the heat pump cycle at the time of a cooling operation (first embodiment)

At the time of cooling operation (see FIG. 4), when a cooling operation switch (not illustrated) is turned on, the air mix door 305 covers the core surface of the heater core 210, so that all of the cooled air passing through the indoor heat exchanger 120 is made to detour around the heater core 210. The refrigerant is circulated in the order of the compressor 110→the outdoor heat exchanger 130→the second pressure reducing unit 162→the internal heat exchanger 150→the first pressure reducing unit 161→the indoor heat exchanger 120→the accumulator 140→the internal heat exchanger 150→the compressor 110.

Figure 5:
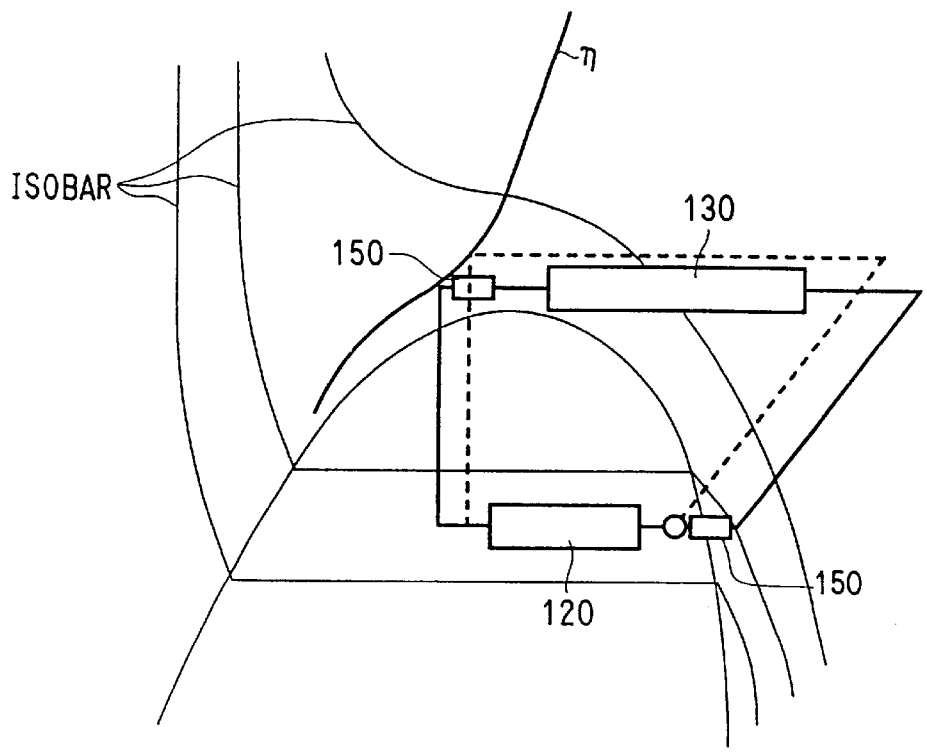
FIG. 5 is a Mollier diagram of the heat pump cycle (first embodiment)

At this time, the valve opening degree of the second pressure reducing unit 162 is made fully open so that pressure loss generated in the second pressure reducing unit 162 is made as low as possible, and the valve opening degree of the first pressure reducing unit 161 is variably controlled so that refrigerant temperature at the outlet side of the outdoor heat exchanger 130, that is, detection temperature of the first temperature sensor 312 and refrigerant pressure at the outlet side of the outdoor heat exchanger 130, that is, detection pressure of the first pressure sensor 311 have the relation indicated by a high pressure control line η of FIG. 5.

Here, the high pressure control line η indicates the relation between the refrigerant temperature at the high pressure, that is, the refrigerant temperature at the outlet side of the outdoor exchanger 130 and the refrigerant pressure at the high pressure side, that is, the refrigerant pressure at the outlet side of the outdoor exchanger 130 so that Coefficient Of Performance (COP) of the cycle becomes maximum. The high pressure control line η at the time of a cooling operation is different from the high pressure control line η at the time of a heating operation.

By this, in the indoor heat exchanger 120, the refrigerant absorbs heat from the air blowing into the compartment and evaporates to cool the air blowing into the compartment, and in the outdoor heat exchanger 130, the heat absorbed from the air blowing into the compartment is released to the outside air so that the refrigerant is condensed.

At this time, in the internal heat exchanger 150, heat exchange is performed in a state where the discharge side refrigerant and the suction side refrigerant form counterflow.

In the air conditioning casing 300, since the air cooled at the indoor heat exchanger 120 detours around the heater core 210, the cooled air flows into the compartment. At this time, the temperature of the air blowing into the compartment is adjusted by controlling the rotation speed of the compressor 110.

Figure 6:
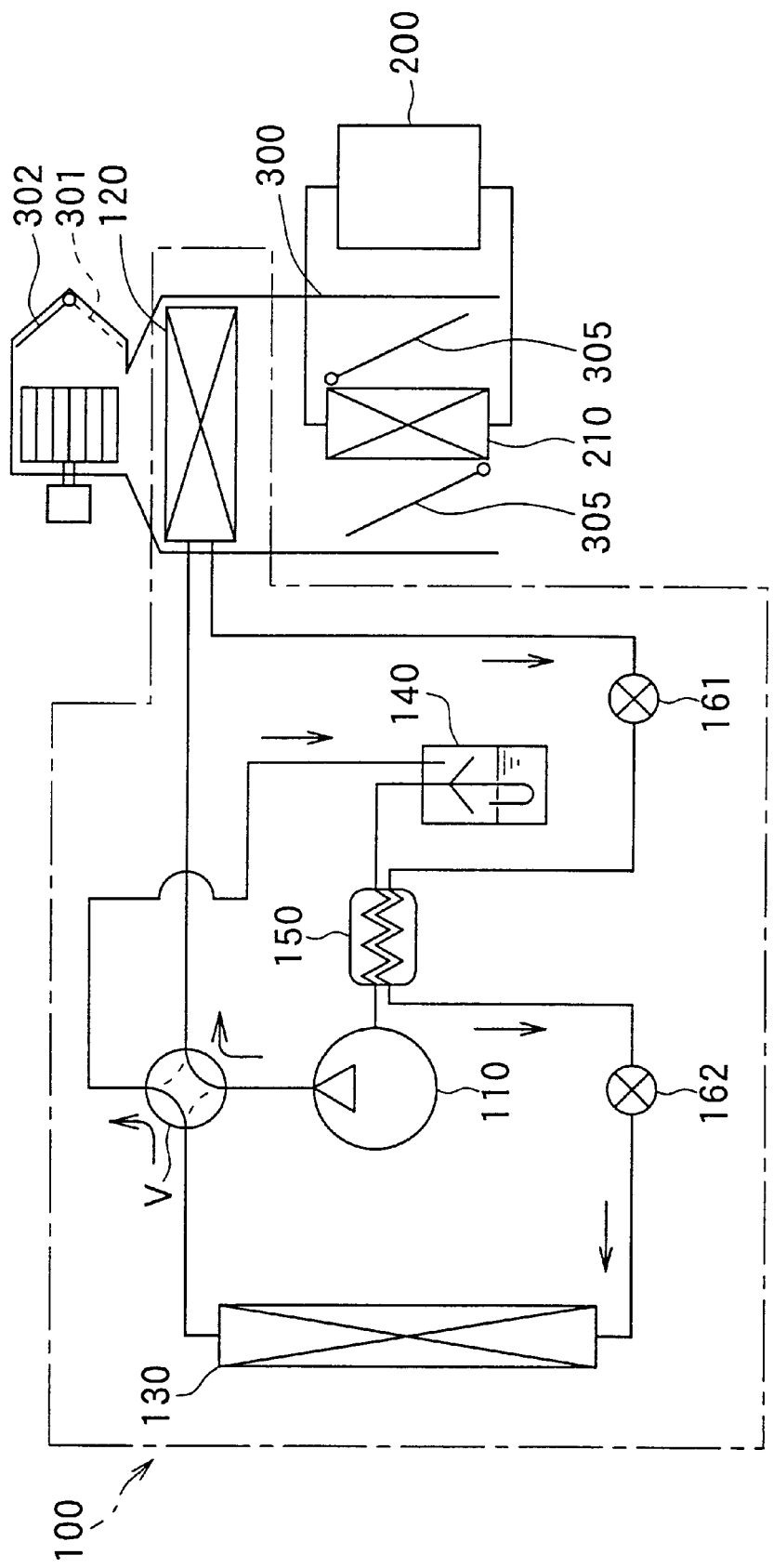
FIG. 6 is a schematic view of showing the heat pump cycle at the time of a heating operation (first embodiment)

When a heating operation switch (not illustrated) is turned on, as shown in FIG. 6, the air mix door 305 is fully opened, so that the air passing through the indoor heat exchanger 120 is made to pass through the heater core 210, and the refrigerant is circulated in the order of the compressor 110→the indoor heat exchanger 120→the first pressure reducing unit 161→the internal heat exchanger 150→the second pressure reducing unit 162→the outdoor heat exchanger 130→the accumulator 140→the internal heat exchanger 150→the compressor 110.

At this time, the valve opening degree of the first pressure reducing unit 161 is made fully open so that pressure loss generated in the first pressure reducing unit 161 is made as low as possible, and the valve opening degree of the second pressure reducing unit 162 is variably controlled so that the refrigerant temperature at the outlet side of the indoor heat exchanger 120, that is, detection temperature of the second temperature sensor 314 and the refrigerant pressure at the outlet side of the indoor heat exchanger 120, that is, detection pressure of the second pressure sensor 312 have the relation indicated by the high pressure control line η.

By this, in the outdoor heat exchanger 130, the refrigerant absorbs heat from the outside air to evaporate, and in the indoor heat exchanger 120, the heat of the refrigerant is radiated to the air blowing into the compartment so that the refrigerant is condensed.

At this time, in the internal heat exchanger 150, heat exchange is performed in a state where the discharge side refrigerant and the suction side refrigerant flow in the same direction.

In the air conditioning casing 300, the air heated by the indoor heat exchanger 120 is again heated by the heater core 210, and the warmed air flows into the compartment. At this time, since the temperature of the air blowing into the compartment is adjusted by controlling the rotation speed of the compressor 110, when heat can be sufficiently obtained by only the heater core 210, the compressor 110 is stopped.

According to the present embodiment, since heat exchange is performed between the discharge side refrigerant and the suction side refrigerant at the time of the heating operation as well, the liquid phase refrigerant containing much lubricating oil in the suction side refrigerant is heated by the discharge side refrigerant, and the liquid phase refrigerant can be evaporated at the time of the heating operation as well.

Thus, since the amount of liquid phase refrigerant to be sucked into the compressor 110 can be reduced, while the increase of compression work of the compressor 110 is prevented, the opening area of the oil return hole 144 can be expanded to such a degree that an optimum amount of lubricating oil can be attained at the time of the heating operation.

Further, since the enthalpy of the discharge side refrigerant can be reduced by performing the heat exchange between the discharge side refrigerant and the suction side refrigerant, the amount of heat absorption in the indoor heat exchanger 120 during the cooling operation, and the amount of heat radiated in the indoor heat exchanger 120 during the heating operation can be increased.

As described above, according to the present embodiment, the amount of lubricating oil needed at the time of the heating operation is secured, and the COP of the heat pump cycle can be maintained.

Figure 7:
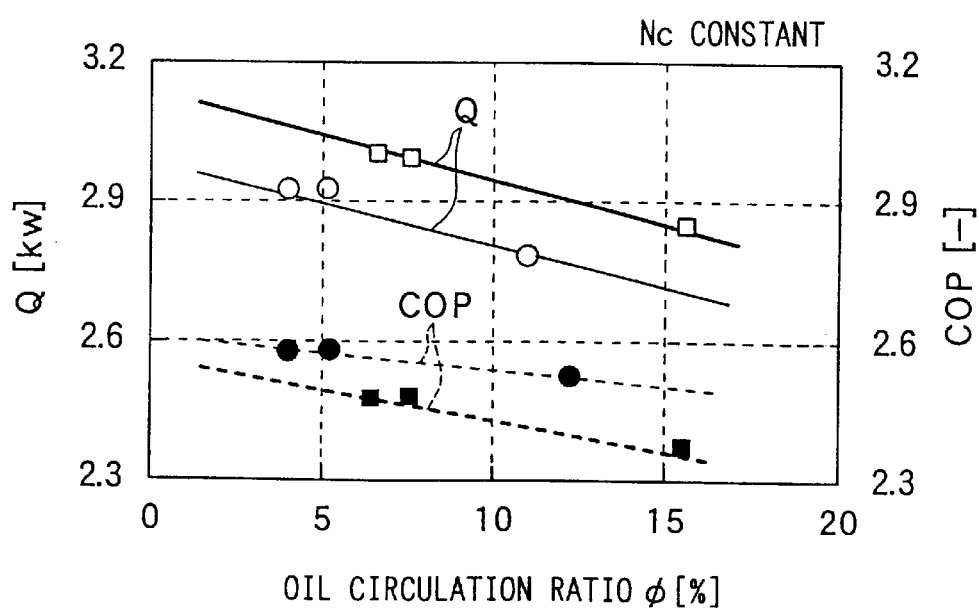
FIG. 7 is a graph showing the heating power and COP of the heat pump cycle (first embodiment)

Here, a state diagram of a cycle shown by a broken line in FIG. 5 indicates a case where the internal heat exchange not performed between the discharge side refrigerant and the suction side refrigerant. A state diagram of a cycle indicated by a solid line in FIG. 5 indicates a case where the internal heat exchange is performed between the discharge side refrigerant and the suction side refrigerant. FIG. 7 is a graph showing the amount of radiated heat, the COP, and the oil circulation ratio of lubricating oil in the case where the internal heat exchange is performed and is not performed.

As is apparent from these graphs as well, it is understood that according to the present embodiment, while the amount of lubricating oil needed during the heating operation is attained, and the COP can be maintained.

Here, the main object of performing the internal heat exchange between the discharge side refrigerant and the suction side refrigerant during the heating operation is, as described above, to decrease the amount of liquid phase refrigerant sucked, together with the lubricating oil, into the compressor 110.

Thus, when the suction side refrigerant is excessively heated, the degree of heating of the refrigerant sucked into the compressor 110 becomes excessively high, so that the COP may decrease contrary. On the other hand, during the cooling operation, as disclosed in the above prior art, it is preferable that heat exchange is positively performed between the discharge side refrigerant and the suction side refrigerant.

Therefore, in the present embodiment, the internal heat exchanger 150 is designed such that, the discharge side refrigerant and the suction side refrigerant form the counterflow during the cooling operation, and the discharge side refrigerant and the suction side refrigerant flow in the same direction during the heating operation. Thus, at the time of the cooling operation, the internal heat exchange between the discharge side refrigerant and the suction side refrigerant is accelerated, and at the time of the heating operation, excessive heat exchange between the discharge side refrigerant and the suction side refrigerant is prevented.

Accordingly, in any case of the time of the cooling operation and the time of the heating operation, the COP of the heat pump cycle is improved.

(Second Embodiment)

Figure 8:
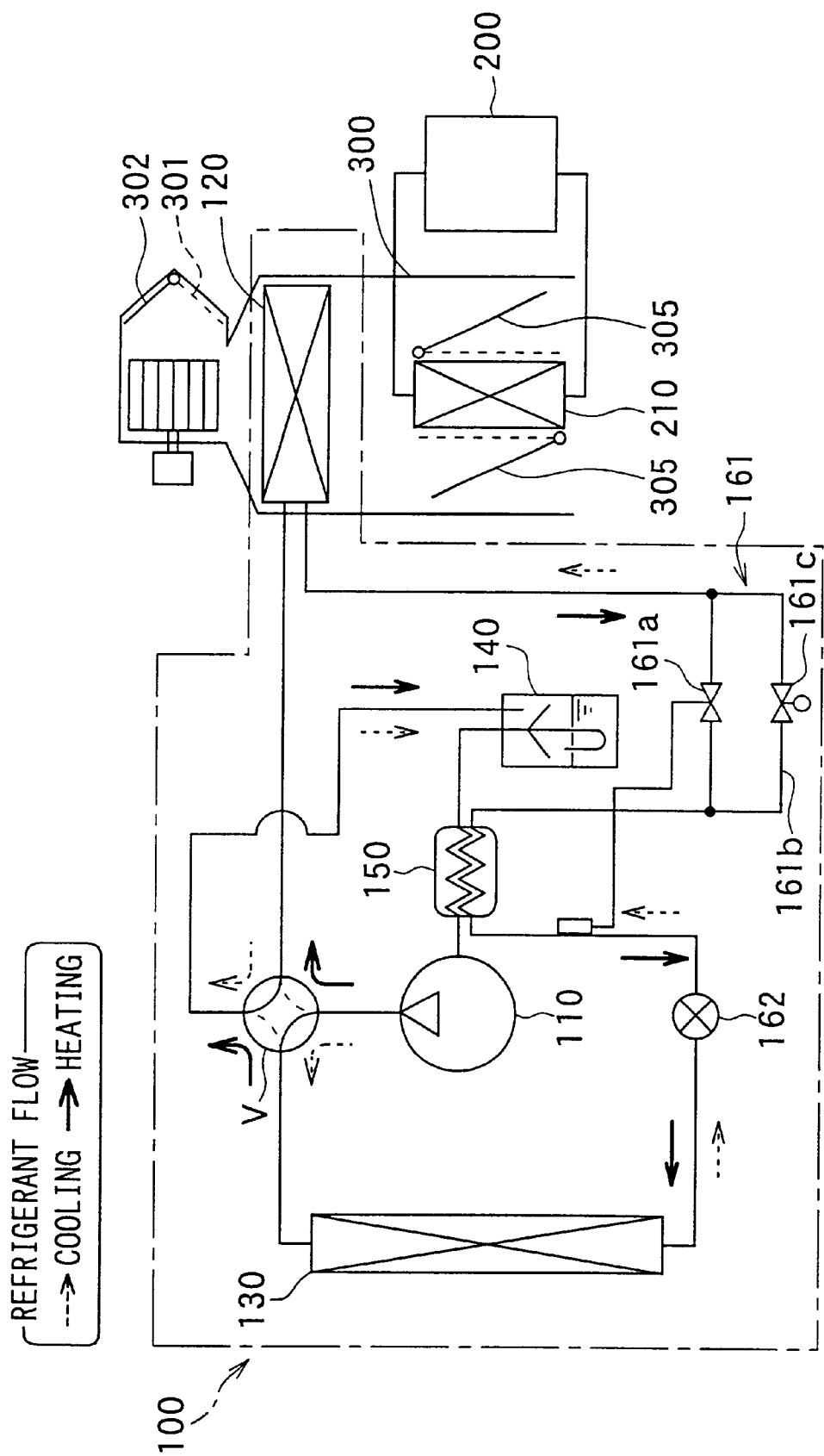
FIG. 8 is a schematic view showing a heat pump cycle (second embodiment)

In the second embodiment, as shown in FIG. 8, a first pressure reducing unit 161 includes a mechanical expansion valve 161a for controlling refrigerant pressure at the outlet side of an outdoor heat exchanger 130 on the basis of the refrigerant temperature at the outlet side of the outdoor heat exchanger 130, a bypass circuit 161b for allowing a refrigerant to detour around the expansion valve 161a, and an electromagnetic valve 161c for switching the bypass circuit 161b.

The electromagnetic valve 161c is controlled by the ECU 310 so that it closes the bypass circuit 161b at the time of the cooling operation and opens the bypass circuit 161b at the time of the heating operation. Here, the operation of the second pressure reducing unit 162 is the same as the first embodiment.

(Third Embodiment)

Figure 9:
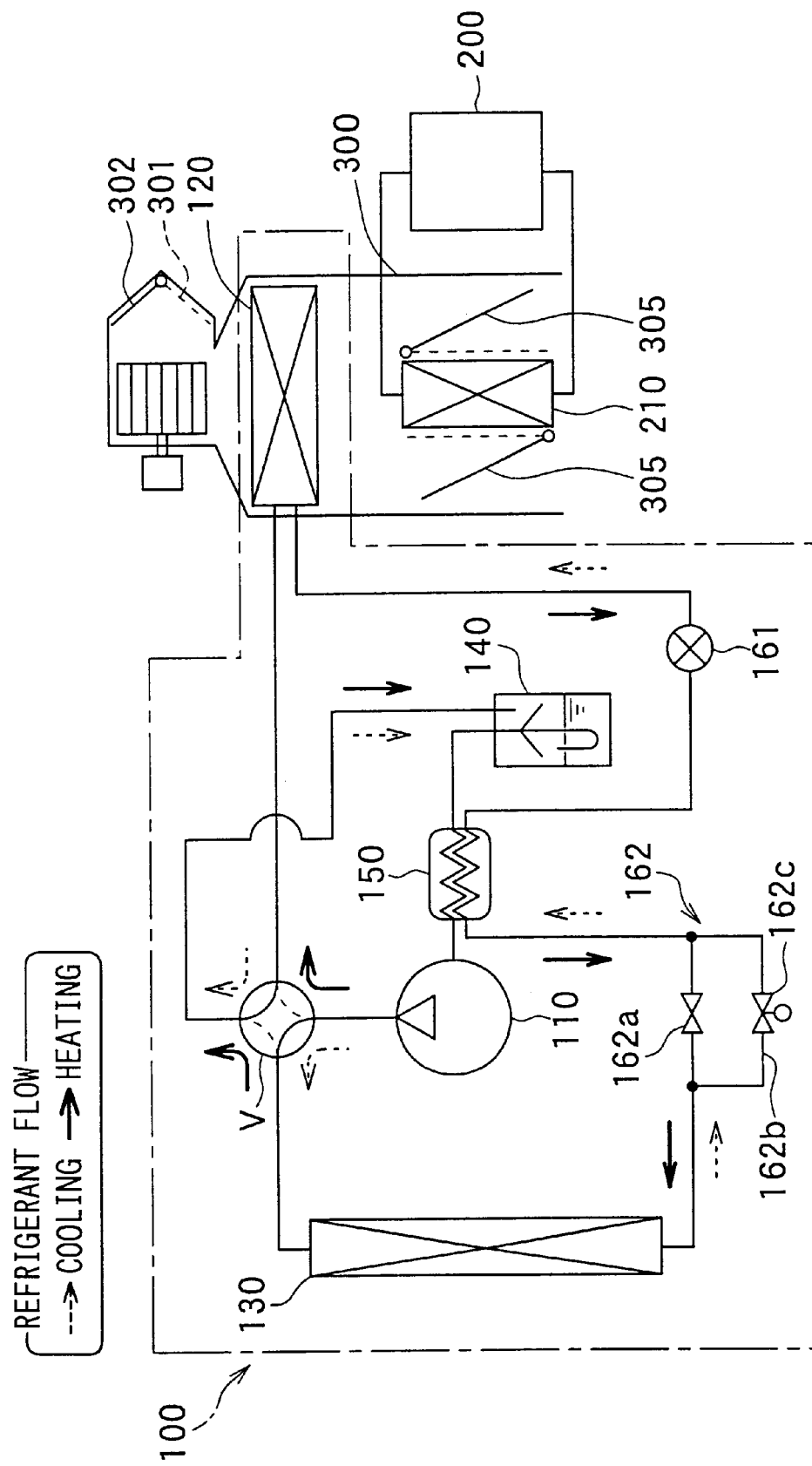
FIG. 9 is a schematic view showing a heat pump cycle (third embodiment)

In the third embodiment, as shown in FIG. 9, a second pressure reducing unit 162 includes a fixed throttle 162a the opening degree of which is fixed, such as an orifice or a capillary tube, a bypass circuit 162b for allowing a refrigerant to detour around the fixed throttle 162a, and an electromagnetic valve 162c for switching the bypass circuit 162b.

The electromagnetic valve 162c is controlled by the ECU 310 so that it opens the bypass circuit 162b at the time of the cooling operation and closes the bypass circuit 162b at the time of the heating operation. The operation of the first pressure reducing unit 161 is the same as the first embodiment.

(Fourth Embodiment)

In the second and third embodiments, the bypass circuits 161b and 162b are switched by the electromagnetic valves 161c and 162c. In the fourth embodiment, as shown in FIGS. 10 and 11, the electromagnetic valves 161c and 162c are replaced by check valves 161d and 162d to permit a refrigerant to flow only in one direction.

Figure 10:
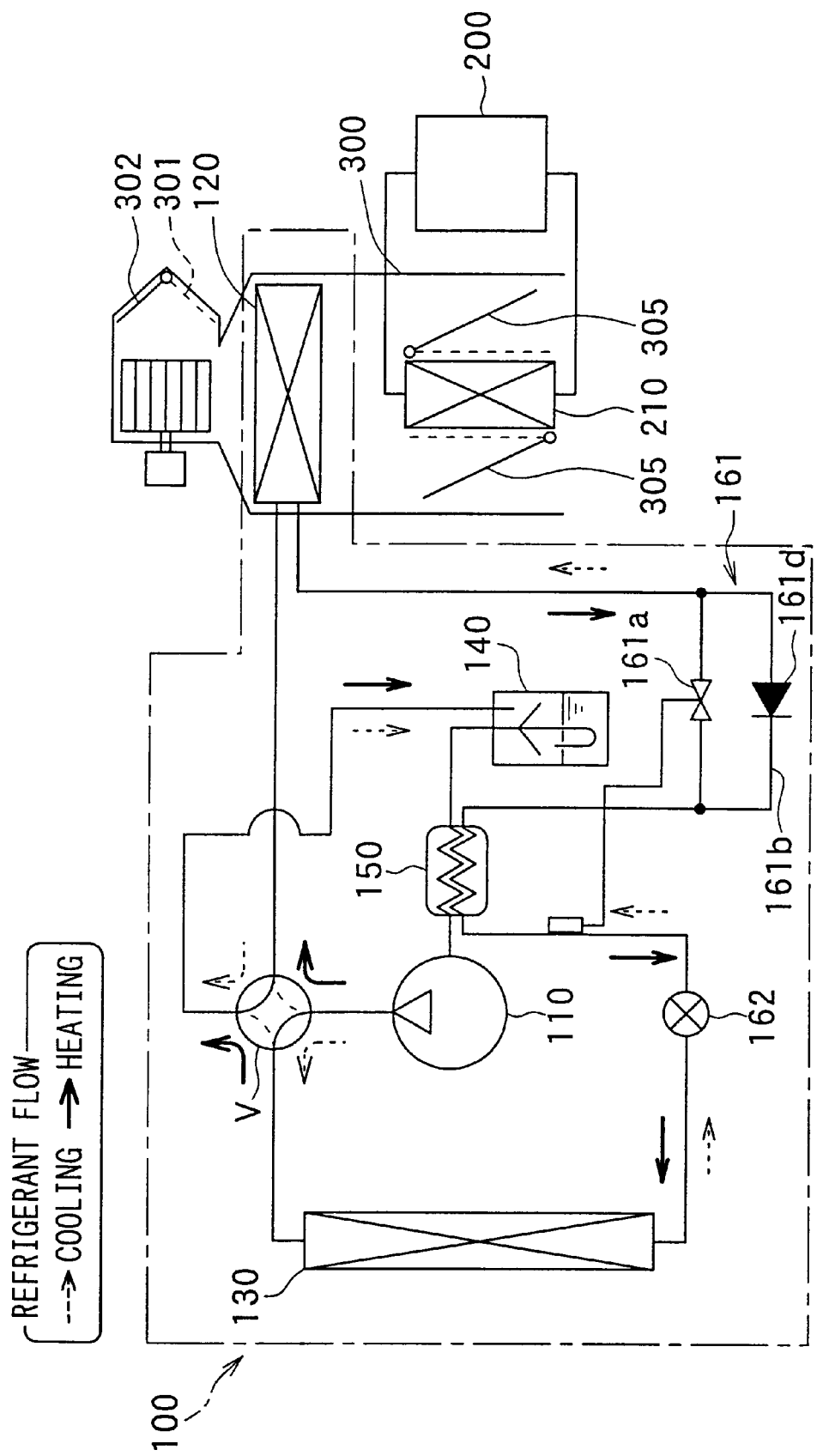
FIG. 10 is a schematic view showing a heat pump cycle (fourth embodiment)
Figure 11:
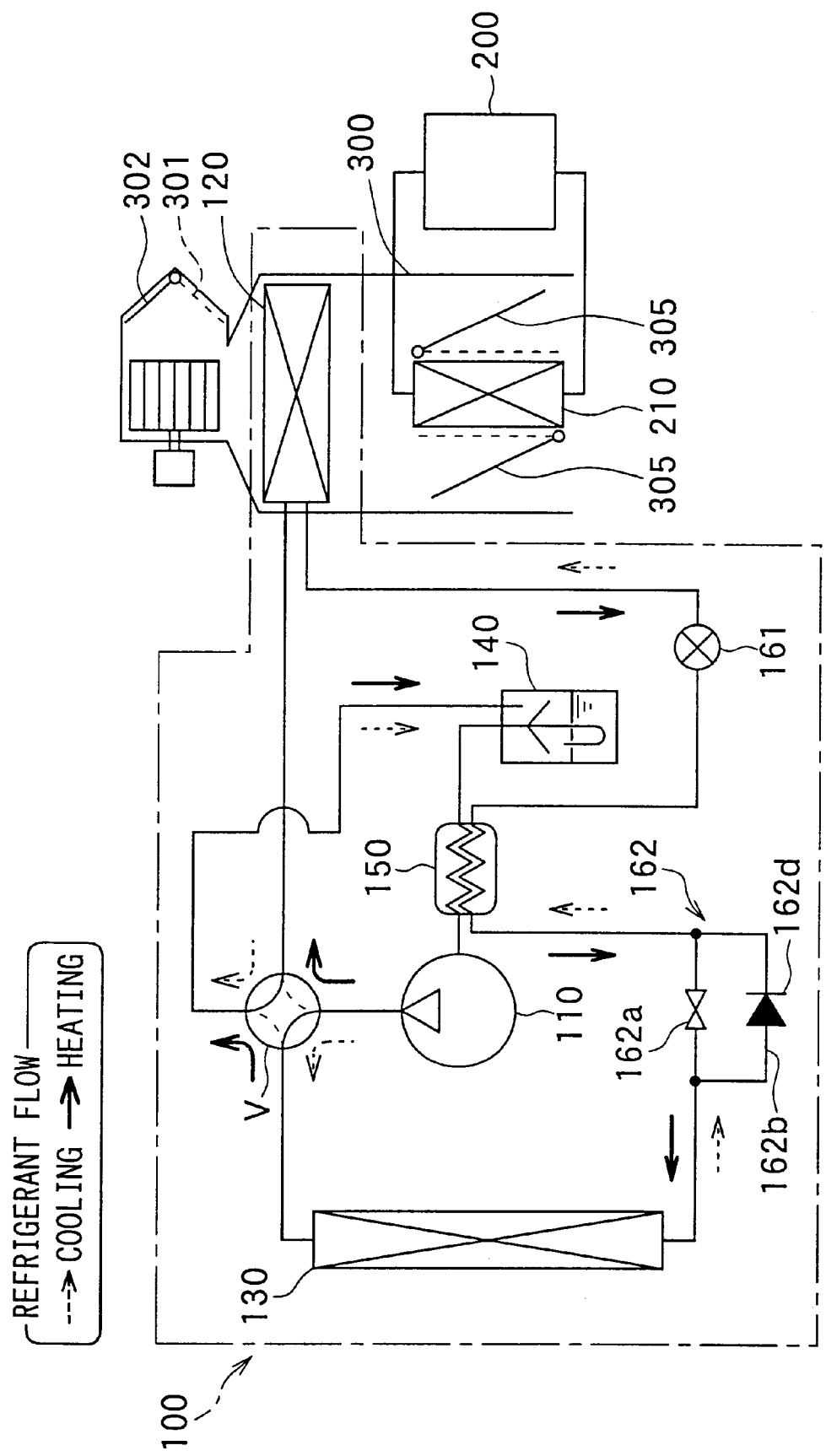
FIG. 11 is a schematic view showing a heat pump cycle (fourth embodiment)

FIG. 10 shows an example in which the fourth embodiment is applied to the second embodiment, and FIG. 11 shows an example in which the fourth embodiment is applied to the third embodiment.

(Fifth Embodiment)

Figure 12:
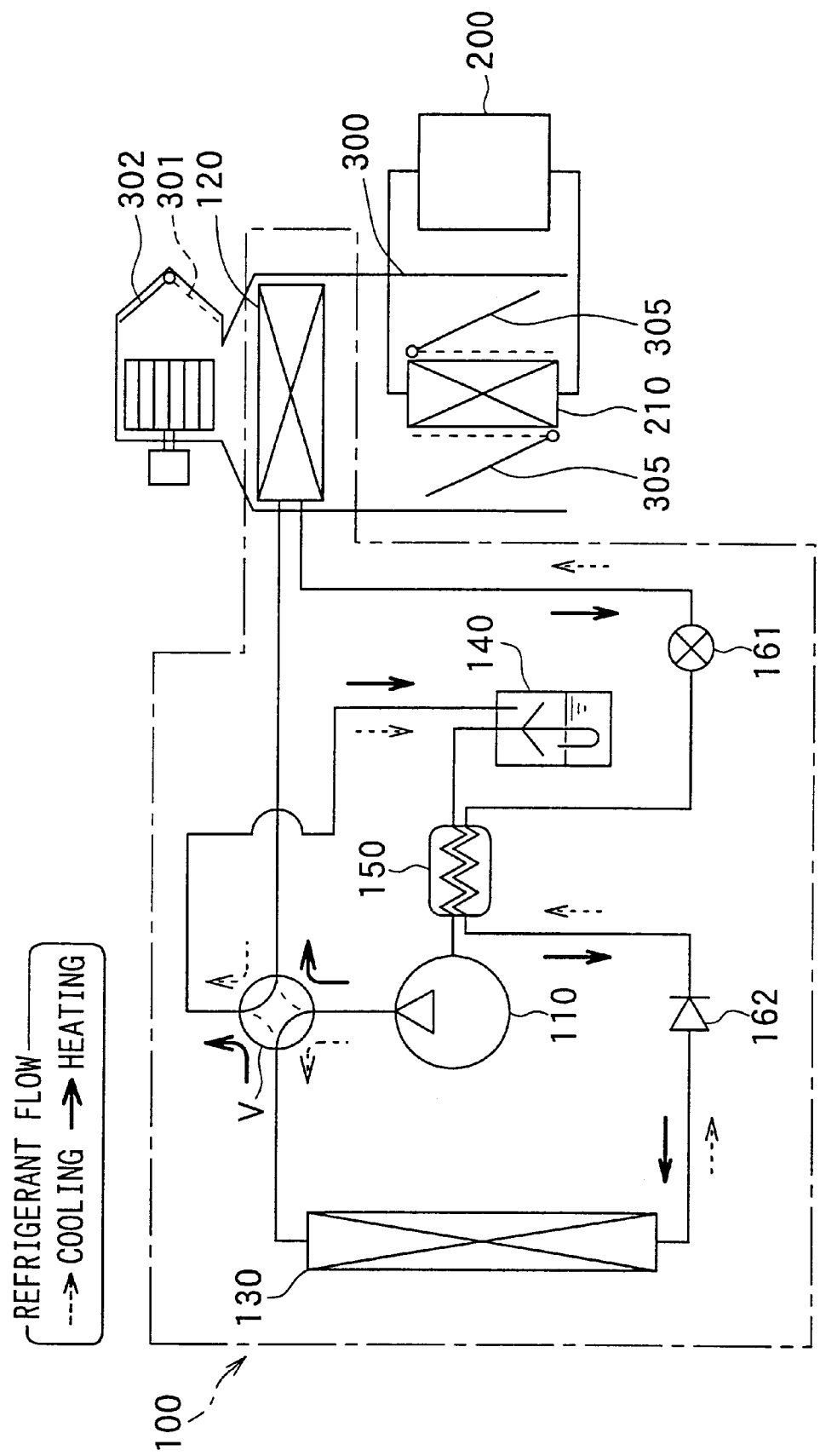
FIG. 12 is a schematic view showing a heat pump cycle (fifth embodiment)

In the fifth embodiment, as shown in FIG. 12, a fixed throttle portion 162a, a bypass circuit 162b, and a check valve 162d are unified to form a second pressure reducing unit 162.

Figure 13:
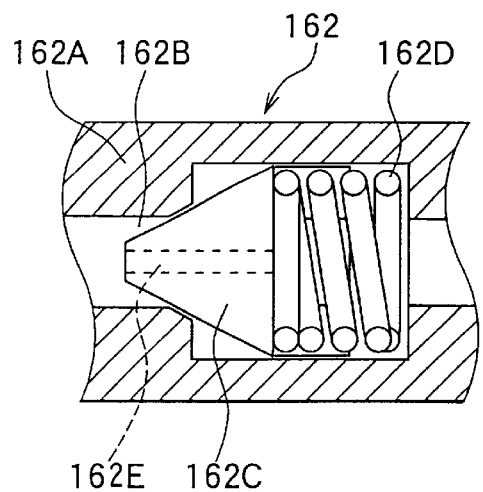
FIG. 13 is a schematic view showing a second pressure reducing unit (fifth embodiment)

For example, as shown in FIG. 13, there are provided a housing 162A forming a refrigerant passage, a valve body 162C which switches a valve port 162B formed in the housing 162A and in which an orifice 162E as a fixed throttle 162a is formed, and a coil spring 162D for exerting force on the valve body 162C in the direction to close the valve port 162B.

Figure 14:
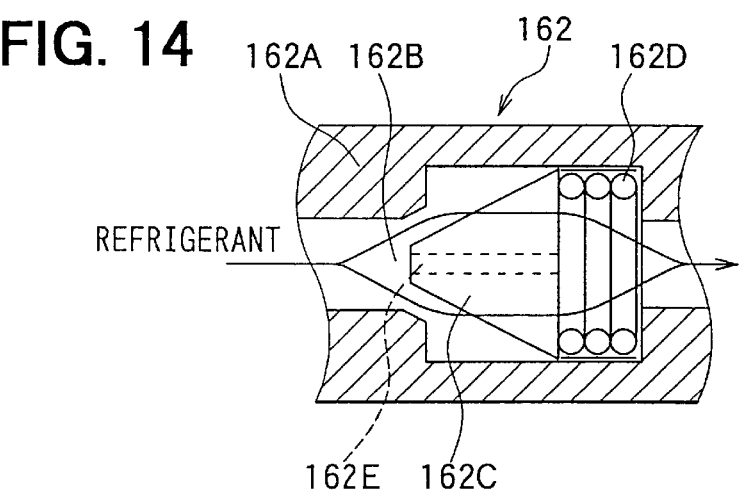
FIG. 14 is a schematic view showing the second pressure reducing unit at the time of a cooling operation (fifth embodiment)

At the time of the cooling operation, as shown in FIG. 14, the valve port 162B comes to have a fully open state by the dynamic pressure of the refrigerant flow acting on the valve body 162C from the side of the valve port 162B, thereby forming a bypass means for decreasing the pressure loss generated in the second pressure reducing unit 162 to the utmost.

Figure 15:
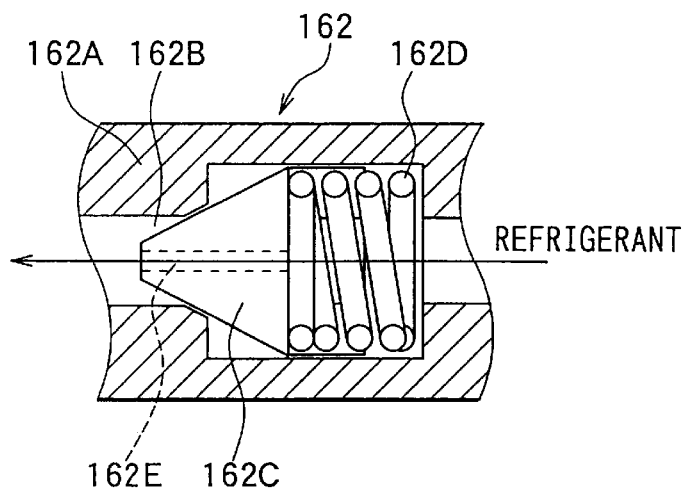
FIG. 15 is a schematic view showing the second pressure reducing unit at the time of a heating operation (fifth embodiment)

At the time of the heating operation, as shown in FIG. 15, since the valve port 162B is closed by the dynamic pressure of the refrigerant flow acting on the valve body 162C from the side of the coil spring 162D, the refrigerant is restricted by the orifice 162E and is decompressed.

(Sixth Embodiment)

Figure 16:
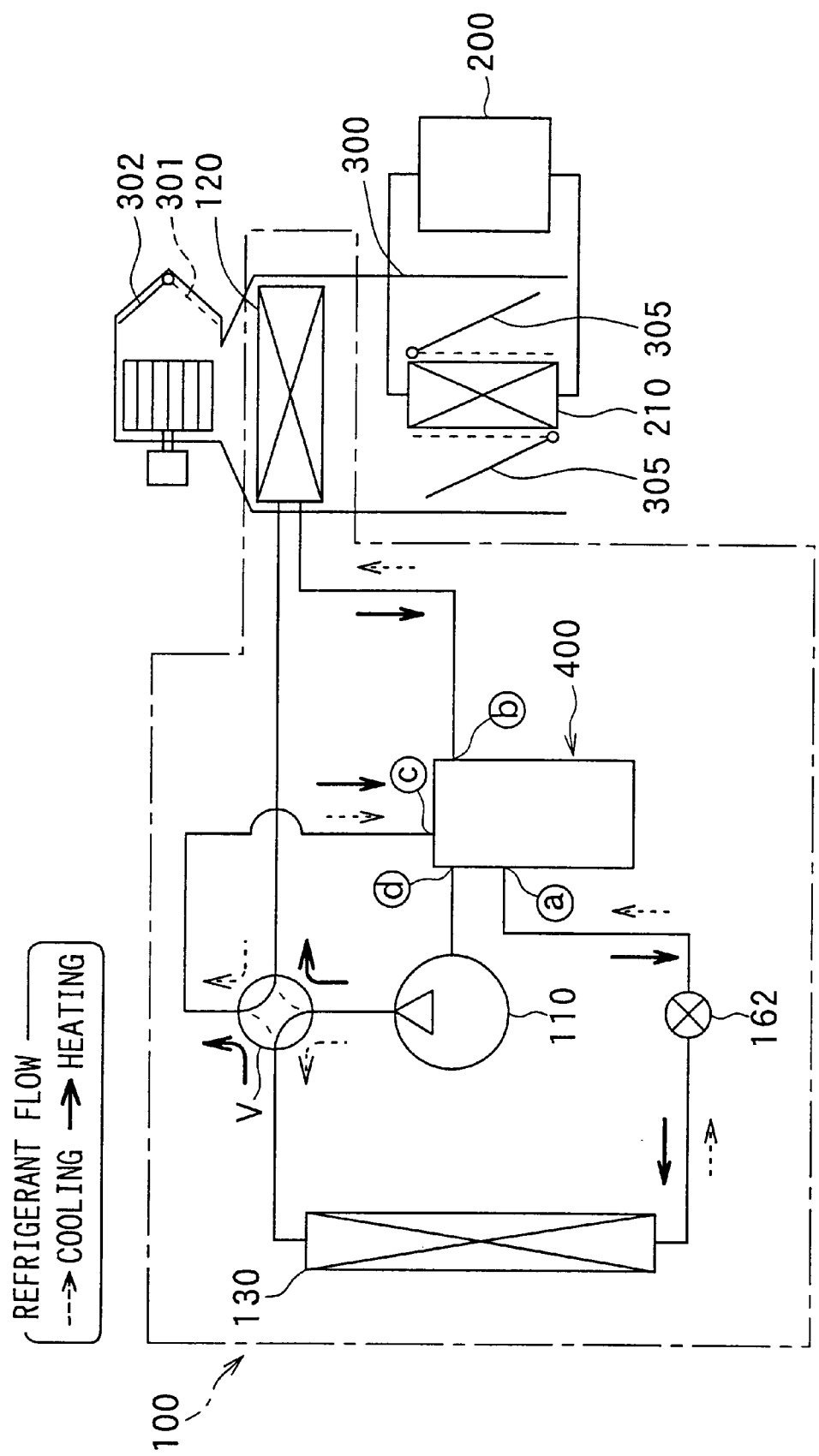
FIG. 16 is a schematic view showing a heat pump cycle (sixth embodiment)

In the sixth embodiment, as shown in FIG. 16, the first pressure reducing unit 161 (see FIG. 10) in the fourth embodiment, the accumulator 140, and the internal heat exchanger 150 are unified to form an accumulator module 400. Here, the second pressure reducing unit 162 and the operation thereof are the same as in the second embodiment.

Figure 17:
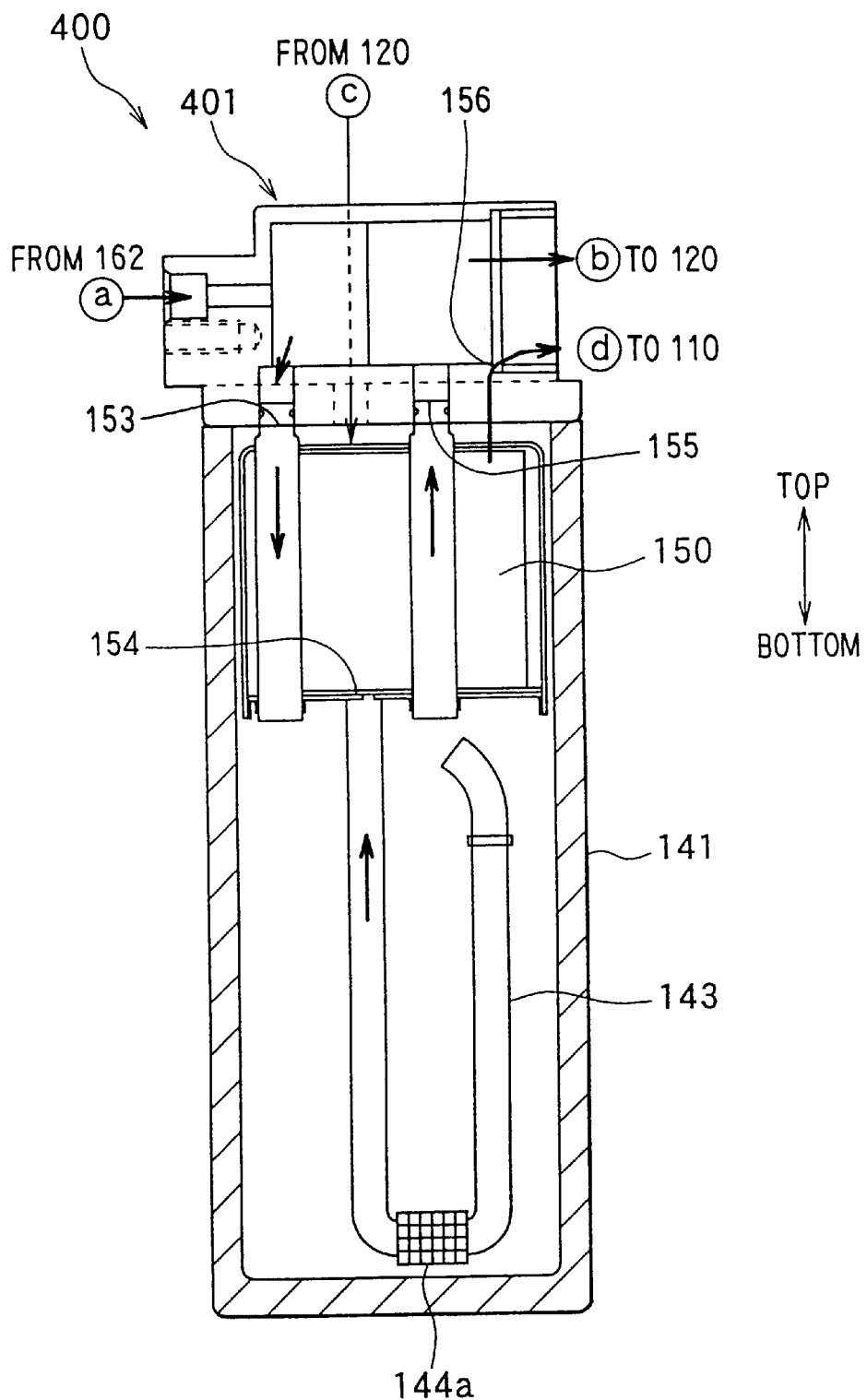
FIG. 17 is a schematic cross-sectional view showing an accumulator module (sixth embodiment)

FIG. 17 is a schematic cross-sectional view showing the accumulator module 400. The upper side of an accumulator housing 141 is closed by a valve module 401 in which a mechanical expansion valve 161a, a bypass circuit 161b, and a check valve 161d are unified, and an internal heat exchanger 150 and a refrigerant discharge pipe 143 are housed in the accumulator housing 141.

In the present embodiment, a filter 144a made of net-shaped metal mesh for preventing foreign matter from being sucked into the refrigerant discharge pipe 143 is provided in an oil return hole 144.

Figure 18:
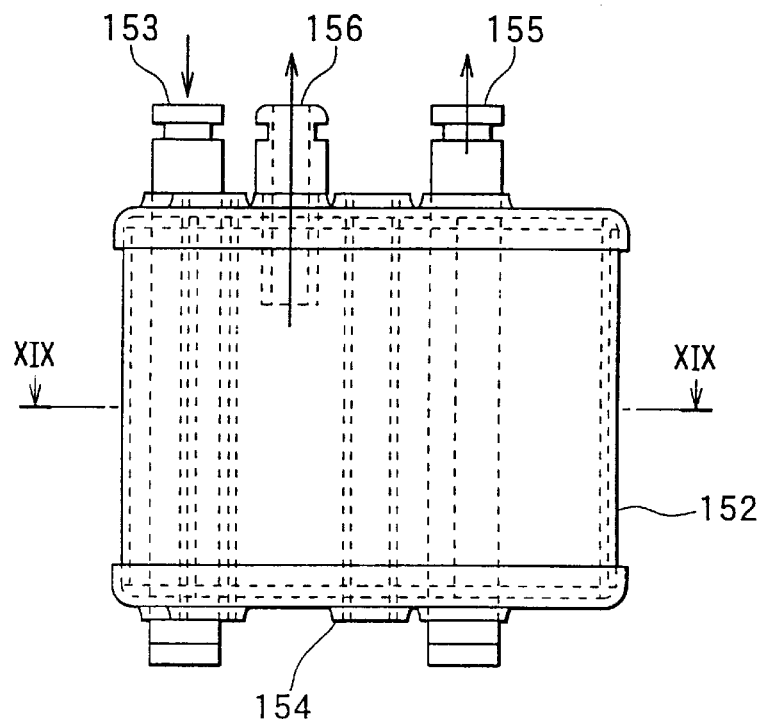
FIG. 18 is a front view showing an internal heat exchanger housed in the accumulator module (sixth embodiment)
Figure 19:
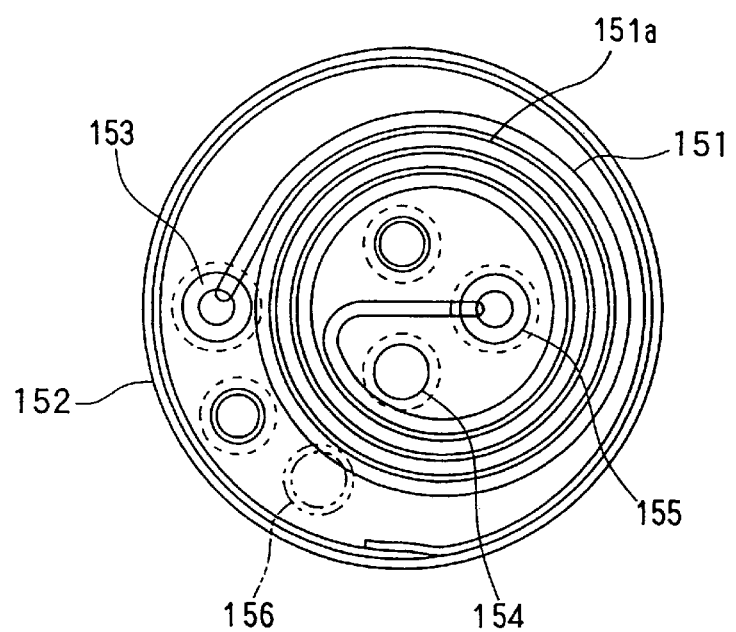
FIG. 19 is a cross-sectional view taken along line XIX—XIX in FIG. 18 (sixth embodiment)

The internal heat exchanger 150 includes, as shown in FIGS. 18 and 19, a cylindrical casing 152 for housing a flat tube 151 through which a discharge side refrigerant flows and which is spirally wound, and opening portions 153–156 for outflow and inflow of the refrigerant, which are formed in the casing 152.

During the cooling operation, the opening portion 153 is for supplying the discharge side refrigerant to the flat tube 151, and the opening portion 155 is for allowing the discharge side refrigerant after heat exchange to flow out of the casing 152. The opening portion 154 is for supplying the suction side refrigerant into the casing 152, and the opening portion 156 is for allowing the suction side refrigerant after heat exchange to flow out to the compressor 110.

Here, a plurality of protrusions 151a are molded on the flat surface of the tube 151 integrally with the tube 151, to protrude over all the region in the longitudinal direction of the tube 151 by extrusion or drawing. The tip ends of the protrusions 151a come in contact with the flat surface of the adjacent tube 151 so that passages through which the suction side refrigerant flows are formed between the adjacent tubes 151.

Figure 20:
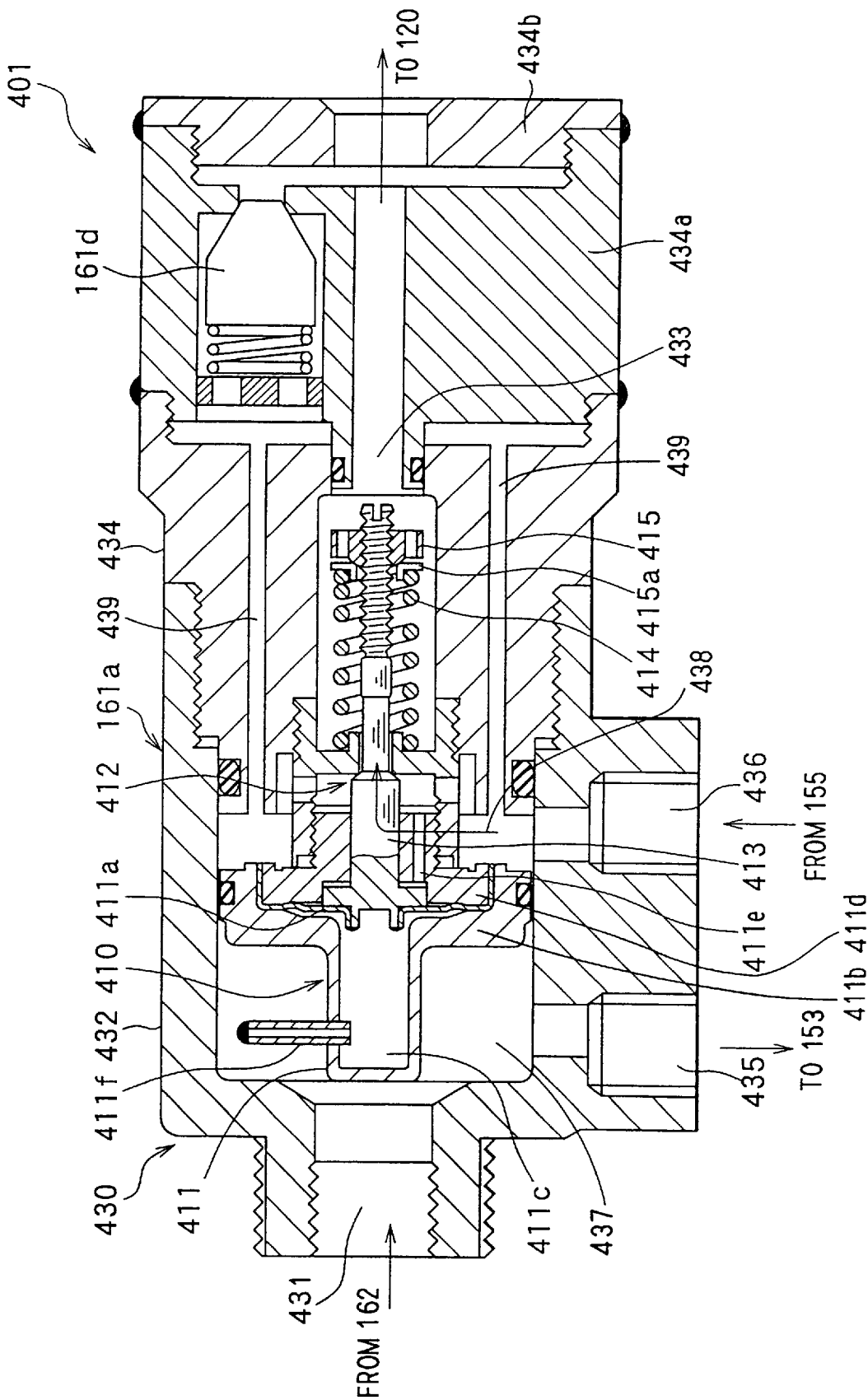
FIG. 20 is a schematic cross-sectional view showing a valve module at the time of a cooling operation (sixth embodiment)

FIG. 20 is a cross-sectional view showing the valve module 401.

A control valve body 410 includes a temperature sensing portion 411 an inner pressure thereof changes in accordance with a refrigerant temperature at a high pressure side, and mechanically interlocks with the change of the inner pressure of the temperature sensing portion 411 to adjust the opening degree of a valve port 412. A casing 430 houses the control valve body 410.

The casing 430 includes a casing body 432, a first center housing 434, a second center housing 434a, and a cover 434b. In the casing body 432, the control valve body 410 is fixed and a first refrigerant passage 431 communicating with the second pressure reducing unit 162 is formed. In the second center housing 434a, a second refrigerant passage 433 communicating with the indoor heat exchanger 120 is formed and the check valve 161d is housed. The cover 434b closes an opening portion through which the control valve body 410 is installed into the casing body portion 432.

In the casing body 432, a refrigerant outlet 435 and a refrigerant inlet 436 are formed. The refrigerant outlet 435 communicates with the refrigerant inlet opening portion 153 of the internal heat exchanger 150, and the refrigerant inlet 436 communicates with the refrigerant outlet opening portion 155 of the internal heat exchanger 150. The refrigerant outlet 435 communicates with the first refrigerant passage 431, and the refrigerant inlet 436 communicates with the refrigerant upstream side of the valve port 412 of the control valve body 410.

Here, a refrigerant passage from the first refrigerant passage 431 to the refrigerant outlet 435 works as a temperature sensing chamber 437, and a refrigerant passage from the refrigerant inlet 436 to the valve port 412 works as an upstream side refrigerant passage 438.

The temperature sensing portion 411 of the control valve body 410 is positioned in the temperature sensing chamber 437 and senses the refrigerant temperature at the outlet side of the outdoor heat exchanger 130. The temperature sensing portion 411 includes a thin film diaphragm 411a, a diaphragm cover 411b forming a hermetically control chamber 411c together with the diaphragm 411a, and a diaphragm support 411d fixing the diaphragm 411a to sandwich the diaphragm 411a together with the diaphragm cover 411b.

A refrigerant is enclosed in the control chamber 411c at a density about 625 kg/m$^3$ in the range from a saturated liquid density at a refrigerant temperature of 0° C. to a saturated liquid density at the critical point of the refrigerant. The pressure in the temperature sensing chamber 437 is led through a pressure lead passage 411e to the opposite side of the control chamber 411c with respect to the diaphragm 411a.

An enclosure pipe 411f encloses the refrigerant in the control chamber 411c, and the enclosure pipe 411f is made of metal having high thermal conductivity, such as copper, to allow a refrigerant temperature in the control chamber 411c to follow a refrigerant temperature in the temperature sensing chamber 437 immediately.

A needle valve body 413 adjusts the opening degree of the valve port 412. The valve body 413 is connected to the diaphragm 411a, and mechanically moves in the direction to decrease the opening degree of the valve port 412 in accordance with the rise of the inner pressure in the control chamber 411c.

A spring 414 urges the valve body 413 in the direction to decrease the opening degree of the valve port 412. The valve body 413 moves in accordance with a balance between the urging force of the spring 414 and a force by an inner and outer differential pressure of the control chamber 411c.

At this time, the initial set load of the spring 414 is adjusted by rotating an adjusting nut 415. The initial set load, that is elastic force in the state where the valve port 412 is closed is set so that the refrigerant has a predetermined supercooling degree about 10° C. in a condensing zone not higher than the critical pressure. For example, it is about 1 [MPa] in terms of pressure in the control chamber 411c at the initial set load. Here, a spring washer 415a prevents the spring 414 from being directly rubbed with the adjusting nut 415 when the adjusting nut 415 is rotated.

According to the structure described above, in the super-critical region, the expansion valve 161a controls the refrigerant pressure at the outlet side of the outdoor heat exchanger 130 to be along an equidensity line of 625 kg/m$^3$ based on the refrigerant temperature at the outlet side of the outdoor heat exchanger 130. In the condensing region, the expansion valve 161a controls the refrigerant pressure at the outlet side of the outdoor heat exchanger 130 so that the supercooling degree of the refrigerant at the outlet side of the outdoor heat exchanger 130 becomes a predetermined value. At this time, in the supercritical region, since the high pressure control line η and the equidensity line of 625 kg/m³ are substantially coincident with each other, the refrigerant pressure at the outlet side of the outdoor heat exchanger 130 is controlled to follow the high pressure control line η.

Here, the diaphragm cover 411b of the control valve body 410 and the diaphragm support 411d works as a partition wall which separates the temperature sensing chamber 437 from the upstream side refrigerant passage 438, and prevents the refrigerant in the upstream side refrigerant passage 438 from being heated by the refrigerant in the temperature sensing chamber 437.

Since the valve body 413 passes through the diaphragm support 411d for guiding the sliding of the valve body 413 to reach the upstream side refrigerant passage 438 from the temperature sensing chamber 437, the gap between the valve body 413 and the diaphragm support 411d has to be made such a degree that plenty of refrigerant does not flow from the temperature sensing chamber 437 through this gap to the upstream side refrigerant passage 438.

Figure 21:
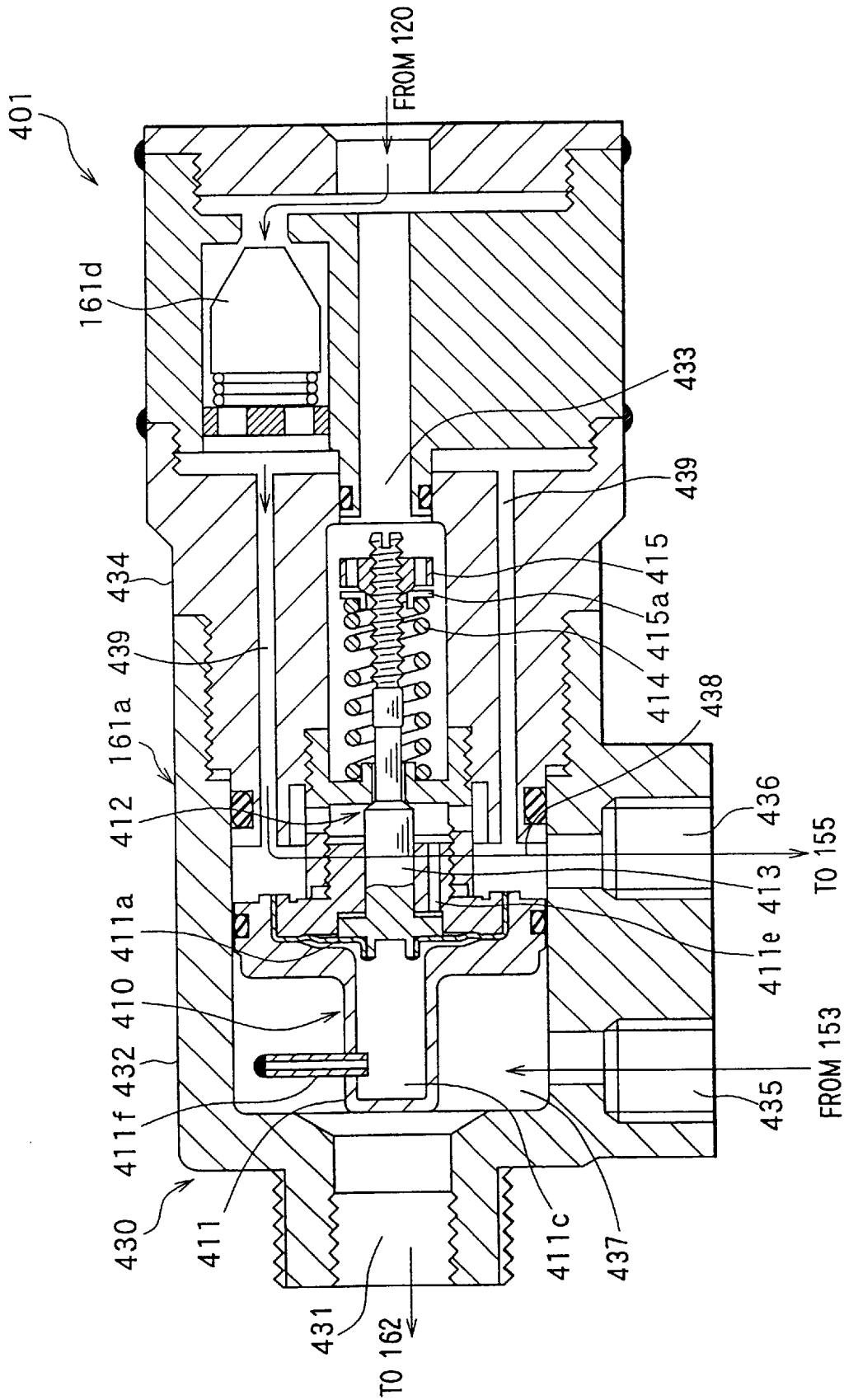
FIG. 21 is a schematic cross-sectional view showing the valve module at the time of a heating operation (sixth embodiment).

FIG. 20 shows a refrigerant flow at the time of a cooling operation, and FIG. 21 shows a refrigerant flow at the time of a heating operation. During the heating operation, by the balance between the force by an inner and outer differential pressure of the control chamber 411c and the urging force of the spring 414, the valve body 413 completely closes the valve port 412. Thus, the refrigerant introduced from the indoor heat exchanger 120 to the valve module 401 does not pass through the second refrigerant passage 433 and flows toward the check valve 161d. Dynamic pressure of the refrigerant opens the check valve 161d, so that the refrigerant flows through the check valve 161d, a refrigerant passage 439, the refrigerant inlet 436, and into the internal heat exchanger 150.

(Modifications)

In the above-described embodiments, the present invention is applied to a fuel cell vehicle. Alternatively, the present invention may be applied to an electric automotive vehicle having a secondary cell such as a battery, and to an automobile having an engine such as gasoline engine or diesel engine.

Further, a heat source is not limited to the FC stack 200, and an electric circuit such as an inverter circuit of a vehicle motor or other heat generating equipment such as a heat engine may be used.

In the above-described embodiments, the heat pump uses carbon dioxide as the refrigerant. Alternatively, the present invention can be applied to a supercritical refrigerating cycle in which ethylene, ethane, nitrogen oxide, or the like is used as refrigerant, and a high pressure side refrigerant pressure exceeds the critical pressure of the refrigerant, and applied to a refrigerating cycle in which flon or the like is used as a refrigerant and a high pressure side refrigerant pressure is less than the critical pressure of the refrigerant.

In the above-described embodiments, the lubricating oil is extracted from the oil return hole 144, together with the gas phase refrigerant separated in the accumulator 140, and flows out of the accumulator 140. Alternatively, the lubricating oil and the gas phase refrigerant may be separated, and flow out and be mixed in the compressor 110. In this case, it is desirable that the internal heat exchanger 150 is structured such that at the time of the cooling operation, heat exchange is performed between the separated gas refrigerant and the discharge side refrigerant, and at the time of the heating operation, heat exchange is performed between the extracted lubricating oil and the discharge side refrigerant.

What is claimed is:

1. A heat pump cycle capable of switching between cooling operation and heating operation, which is used for a vehicle air conditioner, comprising:
   a compressor for sucking and compressing a refrigerant;
   an outdoor heat exchanger for performing a heat exchange between outdoor air and the refrigerant;
   an indoor heat exchanger for performing a heat exchange between indoor air blowing into a vehicle compartment and the refrigerant;
   an accumulator for separating the refrigerant into a gas phase refrigerant and a liquid phase refrigerant containing lubricating oil, said accumulator including an oil return hole for extracting the liquid phase refrigerant containing lubricating oil, and said accumulator allowing the liquid phase refrigerant containing the lubricating oil extracted from said oil return hole and the separated gas phase refrigerant to flow out to said compressor;
   an internal heat exchanger for performing a heat exchange between a discharge side refrigerant flowing between said indoor heat exchanger and said outdoor heat exchanger and a suction side refrigerant flowing out of said accumulator;
   a first pressure reducing unit provided in a refrigerant passage allowing said indoor heat exchanger to communicate with said internal heat exchanger, said first pressure reducing unit decompressing the refrigerant flowing out of said internal heat exchanger at a time of the cooling operation to cool the air blowing into said vehicle compartment; and
   a second pressure reducing unit provided in a refrigerant passage allowing said outdoor heat exchanger to communicate with said internal heat exchanger, said second pressure reducing unit decompressing the refrigerant flowing from said internal heat exchanger to said outdoor heat exchanger at a time of the heating operation to heat the air blowing into said vehicle compartment through said indoor heat exchanger.

2. A heat pump cycle according to claim 1, wherein
   at the time of the cooling operation, the discharge side refrigerant and the suction side refrigerant form counter flow within said internal heat exchanger, and
   at the time of the heating operation, the discharge side refrigerant and the suction side refrigerant flow in a same direction within said internal heat exchanger.

3. A heat pump cycle according to claim 1, wherein
   said first pressure reducing unit variably controls a valve opening degree at the time of the cooling operation, and makes the valve opening degree fully open at the time of the heating operation, and
   said second pressure reducing unit variably controls a valve opening degree at the time of the heating operation, and makes the valve opening degree fully open at the time of the cooling operation.

4. A heat pump cycle according to claim 1, wherein said first pressure reducing unit includes a control valve portion for variably controlling the valve opening degree at the time of the cooling operation, and a bypass portion for allowing the refrigerant to detour around the control valve portion at the time of the heating operation.

5. A heat pump cycle according to claim 4, wherein said accumulator, said first pressure reducing unit and said internal heat exchanger are unified to form an accumulator module.

6. A heat pump cycle according to claim 5, wherein
   said accumulator module includes a valve module containing said first pressure reducing unit, and said valve module is disposed at an upper area of said accumulator module.

7. A heat pump cycle according to claim 1, wherein said second pressure reducing unit includes a fixed throttle portion in which an opening degree for decompression of the refrigerant is fixed at the time of the heating operation, and a bypass portion for allowing the refrigerant to detour around said fixed throttle portion at the time of the cooling operation.

8. A heat pump cycle according to claim 7, wherein
said second pressure reducing unit includes a valve body opening and closing a valve port, said valve body has the fixed throttle portion,
said valve body closes said valve port at the time of the heating operation, and
said valve body fully opens said valve port at the time of the cooling operation.

9. A heat pump cycle according to claims 1, wherein the refrigerant is carbon dioxide.

10. A heat pump cycle according to claim 1, wherein said accumulator and said internal heat exchanger are unified.

11. A heat pump cycle according to claim 1 wherein refrigerant flows from the compressor to the indoor heat exchanger and then to the internal heat exchanger during the heating operation.

* * * * *